United States Patent
Suzuki et al.

(10) Patent No.: US 7,271,745 B2
(45) Date of Patent: Sep. 18, 2007

(54) RESAMPLING DETECTION APPARATUS, RESAMPLING DETECTION METHOD, RESAMPLING APPARATUS, AND RESAMPLING METHOD

(75) Inventors: Junya Suzuki, Osaka (JP); Hiroshi Saito, Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 11/401,265

(22) Filed: Apr. 11, 2006

(65) Prior Publication Data
US 2006/0232453 A1  Oct. 19, 2006

(30) Foreign Application Priority Data
Apr. 13, 2005  (JP)  ............... 2005-115320

(51) Int. Cl.
*H03M 7/00*  (2006.01)
(52) U.S. Cl. .......................... 341/61; 341/60
(58) Field of Classification Search .......... 341/50–90; 348/158, 173
See application file for complete search history.

(56) References Cited

U.S. PATENT DOCUMENTS

| | | | | |
|---|---|---|---|---|
| 5,119,193 A | * | 6/1992 | Noji | 348/629 |
| 5,177,700 A | * | 1/1993 | Gockler | 708/313 |
| 5,323,232 A | | 6/1994 | Otaka et al. | |
| 5,383,144 A | * | 1/1995 | Kato | 708/313 |

FOREIGN PATENT DOCUMENTS

| | | |
|---|---|---|
| EP | 0469892 | 2/1992 |
| JP | 4-185127 | 7/1992 |

OTHER PUBLICATIONS

English Language Abstract of JP 4-185127.
English Language Abstract of JP 4-185127, Jul. 2, 1992.

* cited by examiner

*Primary Examiner*—Lam T. Mai
(74) *Attorney, Agent, or Firm*—Greenblum & Bernstein, P.L.C.

(57) ABSTRACT

A resampling detection apparatus for receiving a plurality of input signals composing a digital signal, and detecting whether the digital signal is a resampled signal, includes an estimation section that estimates a signal before resampling for the digital signal from one or more input signals, and a detecting section detects whether the digital signal is a resampled signal, using the estimated signal and one or more input signals.

13 Claims, 8 Drawing Sheets

*Fig. 1A*  *Fig. 1B*
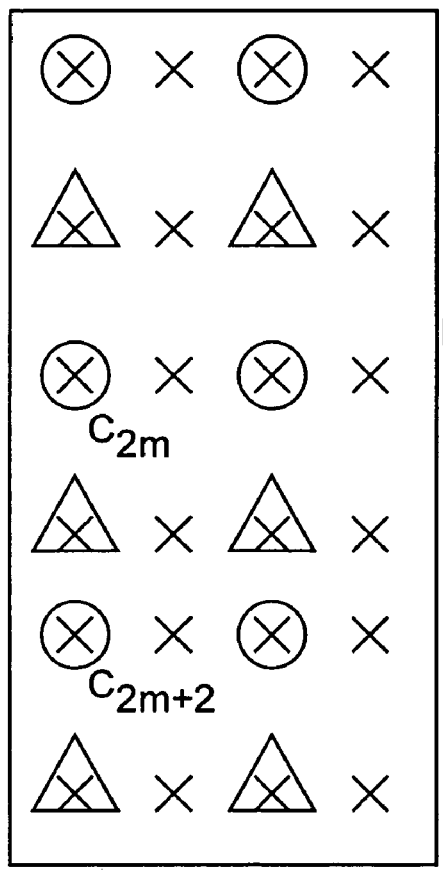
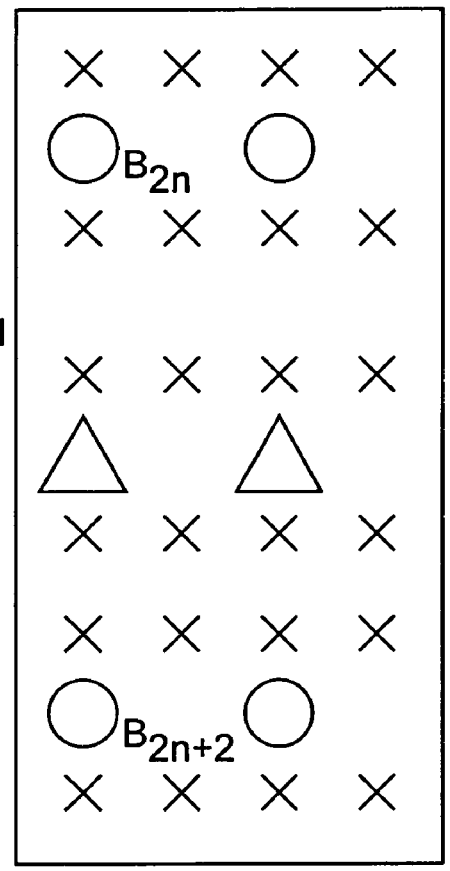
YUV 4:2:2    YUV 4:2:0
× --- LUMINANCE SIGNAL
○ --- COLOR-DIFFERENCE SIGNAL OF FIRST FIELD
△ --- COLOR-DIFFERENCE SIGNAL OF SECOND FIELD

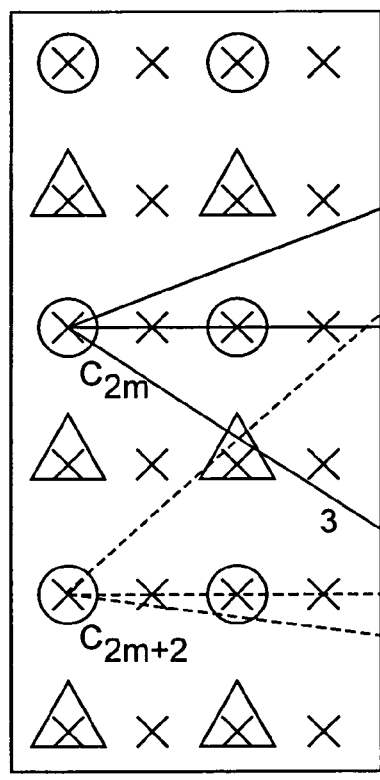
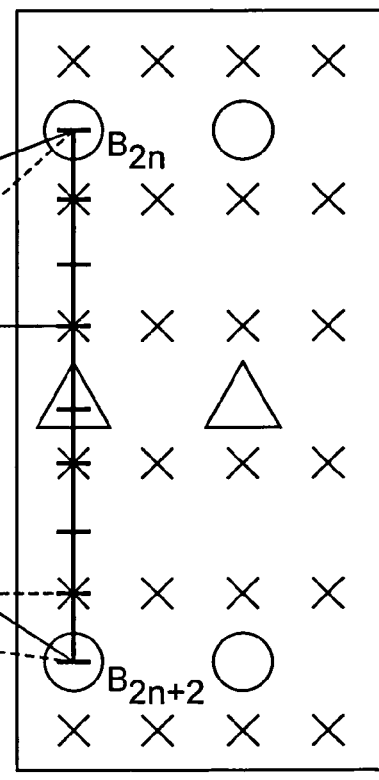
*Fig.2A* *Fig.2B*
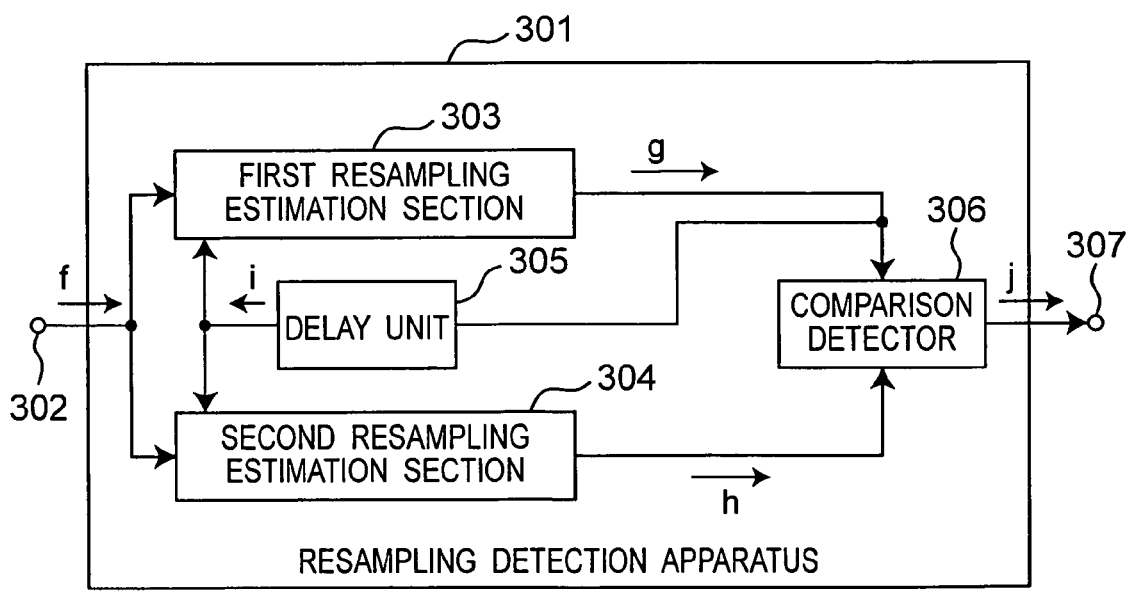
*Fig.3*

YUV 4:2:2

YUV 4:2:0

YUV 4:2:2

YUV 4:2:0

DOWNSAMPLING (DECIMATION)

UPSAMPLING (INTERPOLATION)

RESAMPLING DETECTION APPARATUS, RESAMPLING DETECTION METHOD, RESAMPLING APPARATUS, AND RESAMPLING METHOD

BACKGROUND OF THE INVENTION

1. Field of the Invention

The invention relates to a resampling detection apparatus capable of detecting whether a digital input signal such as a video signal or audio signal is resampled or not, and a resampling apparatus using the same.

2. Related Art

Resampling process for converting a sampling frequency is often applied to a digital signal generated by sampling a video signal. The resampling process includes downsampling (subsampling) for generating new sampling data by decimating the original sampling data, and upsampling for generating new sampling data by interpolating the original sampling data. Resampling process is also called sampling rate conversion process.

For example, a resampling apparatus incorporated in a recording and reproducing apparatus such as a digital VTR processes an input video signal by downsampling with a decimating filter for recording, and processes the video signal being read out from the recording medium by upsampling by interpolating filter reversely for reproducing. When dubbing is repeated by using such resampling apparatus, however, filtering is processed by the resampling apparatus on every dubbing, and downsampling and upsampling are repeated. As a result, the frequency characteristic of the signal deteriorates.

Various methods have been proposed so far to solve these problems. For example, in downsampling process, when it is detected that the input signal is a signal which has already been upsampled, that is, the input signal is a signal which is reproduced after being recorded, the sample is extracted by skipping the filtering process. Furthermore, the upsampling process includes a method which causes data of undecimated samples not to be changed before and after interpolating process. According to such a method, deterioration of a signal by repetition of downsampling and upsampling can be prevented (see, for example, patent document 1).

FIGS. 10A to 10C show sample phases of one-dimensional signal converted by a conventional resampling apparatus. FIG. 10A shows downsampling, and FIG. 10B shows upsampling. In the diagram, the black circle "•" shows a sample decimated by downsampling, the white circle "○" shows a sample directly output, and the double circle "◎" shows a sample interpolated by upsampling.

As shown in FIG. 10A, when recording input signal a while downsampling it, in input signal a of sampling rate Fs, every other sample (•) of input signal a is decimated, and the remaining samples (○) are output directly. As a result, decimated signal b of sampling rate Fs/2 is obtained, and it is recorded in the recording medium.

Further, as shown in FIG. 10B, when upsampling on reproduction of a signal from the recording medium, a decimated signal b of sampling rate Fs/2 is received, and in addition to each sample (○) of input signal b, new sample (◎) of data obtained by interpolation is inserted in intermediate position of each sample (○). Thus, the interpolated signal c of sampling rate Fs is obtained, and it is reproduced and output. Afterwards, when downsampling and recording this signal c, the signal b can be restored and recorded, by decimating the sample (◎) inserted on the upsampling. Therefore, when downsampling and upsampling are repeated by this resampling apparatus, undecimated sample (○) is always held, and frequency characteristic of the signal does not deteriorate.

Patent document: JP, 04-185127, A

However, the conventional resampling apparatus cannot be applied in the case where sample phases are not matched before and after resampling process such as downsampling process or upsampling process. In recent sampling process, phases are often not matched before and after resampling process, and the conventional resampling apparatus cannot be applied in such a case.

For example, using two-tap filter, as shown in FIG. 10C, when a signal d of sampling rate of 48 kHz (signal values: $d_0, d_1, d_2, d_3$) is downsampled to a signal e of sampling rate of 24 kHz (signal values: $e_0, e_1, e_2$) without matching in phase, for example, a signal $e_0$ is expressed in formula (1) and a signal $e_1$ in formula (2).

$$e_0 = \frac{d_0 + d_1}{2} \quad (1)$$

$$e_1 = \frac{d_1 + d_2}{2} \quad (2)$$

Further, when a signal e is upsampled to a signal d' of sampling rate of 48 kHz (signal values: $d'_0, d'_1, d'_2, d'_3$), for example, a signal $d'_1$ is expressed in formula (3), and does not coincide with the original signal $d_1$.

$$d'_1 = \frac{d_0 + 2d_1 + d_2}{2} \quad (3)$$

Thus, when sampling process not coinciding in phase is repeated, a signal deteriorates after every repetition. This deterioration cannot be suppressed by the conventional resampling apparatus.

SUMMARY OF THE INVENTION

The present invention is devised to solve the problems, and it is hence an object thereof to present a resampling detection apparatus capable of detecting whether the signal has already been resampled or not even if the phases are not matched before and after resampling process, and a sampling apparatus capable of reducing deterioration of a signal due to repletion of sampling process.

A first aspect of the invention provides a resampling detection apparatus for receiving a plurality of input signals composing a digital signal, and detecting whether the digital signal is a resampled signal. The resampling detection apparatus includes an estimation section operable to estimate a signal before resampling for the digital signal from one or more input signals, and a detecting section operable to detect whether the digital signal is a resampled signal, using the estimated signal and one or more input signals.

A second aspect of the invention provides a resampling apparatus for receiving a plurality of input signals for composing a digital signal through an input terminal, resampling and outputting the received signals through an output terminal.

The resampling apparatus includes a signal restoring section operable to generate a signal before resampling for the digital signal from one or more input signals, a signal decimating section operable to decimate the one or more input signals, a resampling detecting section operable to detect whether the digital signal is a resampled signal from one or more input signals, and output a detection signal when the digital signal is detected to be a resampled signal, or output an undetection signal when the digital signal is not detected to be a resampled signal, and a switch operable to receive an output from the resampling detecting section, and connect an output from the signal restoring section to the output terminal when the output from the resampling detecting section is the detection signal, or connect an output from the signal decimating section to the output terminal when the output from the resampling detecting section is the undetection signal.

The resampling detecting section includes an estimation section operable to estimate a signal before resampling for the digital signal from one or more input signals, and a detecting section operable to detect whether the digital signal is a resampled signal using the estimated signal and one or more input signals.

A third aspect of the invention provides a resampling detecting method for receiving a plurality of input signals composing a digital signal, and detecting whether the digital signal is a resampled signal. The resampling detecting method includes the steps of estimating a signal before resampling for the digital signal from one or more input signals, and detecting whether the digital signal is a resampled signal using the estimated signal and one or more input signals.

In a fourth aspect of the invention, provided is a resampling method for receiving a plurality of input signals composing a digital signal and resampling the received signal to output the resampled signal. The resampling method includes the steps of restoring a signal before resampling for the digital signal from one or more input signals, decimating the one or more input signals, estimating a signal before resampling for the digital signal from one or more input signals; detecting whether the digital signal is a resampled signal while using the estimated signal and one or more input signals, and outputting the restored signal before resampling when the digital signal is detected to be a resampled signal, while outputting the decimated signal when the digital signal is not detected to be a resampled signal.

According to the resampling detection apparatus and method of the invention, even if phases are not matched before and after resampling, it can be detected whether the input signal has already been resampled or not. Using the result of the detection can achieve, for example, a recording and reproducing apparatus capable of suppressing deterioration of frequency characteristic of signal due to repetition of dubbing (resampling).

Further, according to the resampling apparatus and method of the invention, it is detected whether the input signal has already been resampled or not, if the input signal has already been resampled, the original data before resampling are restored and output. Hence, deterioration of frequency characteristic of signal due to repetition of dubbing (resampling) can be suppressed.

BRIEF DESCRIPTION OF THE DRAWINGS

FIGS. 1A and 1B are explanatory diagrams of a resampling process not matched in phase.

FIGS. 2A and 2B are explanatory diagrams of a filtering process in consideration of phase.

FIG. 3 is a block diagram of a resampling detection apparatus in embodiments 1 and 2.

DETAILED DESCRIPTION OF THE PREFERRED EMBODIMENTS

Figure 4A:
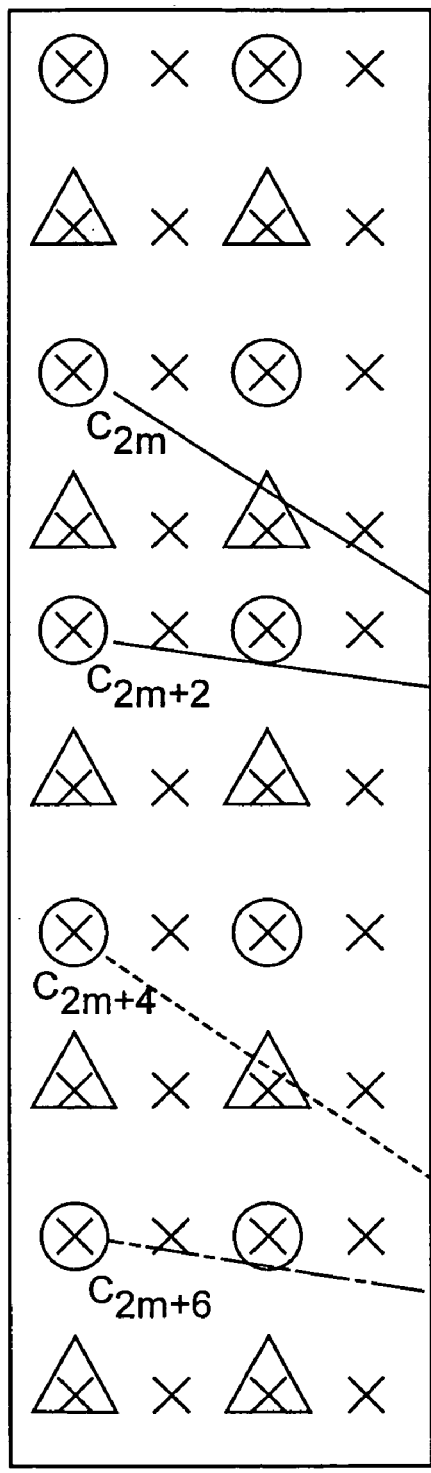
FIGS. 4A and 4B are explanatory diagrams of a resampling detecting operation in embodiment 2.

Referring now to the accompanying drawings, preferred embodiments of the invention are described specifically below.

Embodiment 1

This embodiment relates to a resampling detection apparatus that receives a digital video signal, and detects whether the input digital video signal is a signal which has been resampled or not.

In the resampling detection apparatuss in this embodiment and the following embodiments, a plurality of input signals composing a digital video signal are assumed to be signals resampled by a FIR digital filter. The resampling detection apparatus determines required conditions for establishing the assumption from the assumed filter coefficient and boundary condition (initial value), judges whether the input signals satisfy the required conditions or not under boundary condition, and detects whether the input signals are resampled signals or not.

1. Resampling Process with FIR Filter

For the ease of understanding of principle of resampling detection apparatus of the embodiment, first of all, resampling process using two-tap FIR digital filter is explained. The FIR digital filter is often used in resampling of signals because operation thereof is stable and suitable for high speed operation.

FIGS. 1A and 1B are schematic diagrams of a video signal in the case of resampling process is applied to one frame of a video signal including luminance signal and color difference signal. In FIGS. 1A and 1B, a symbol "x" denotes a luminance signal, mark "○" indicates a color difference signal of a first field, and the triangle mark "Δ" shows a color difference signal of a second field. In FIG. 1A shows the phase relation of luminance and color difference in YUV 4:2:2 format, and FIG. 1B is in the case of YUV 4:2:0 format. Further in FIG. 1A, $C_k$ (k=0, 1, 2, . . . ) is a signal value of the color difference signal in the case of YUV 4:2:2 format. In FIG. 1B, similarly, $B_j$ (j=0, 1, 2, . . . ) is a signal value of the color difference signal in the case of YUV 4:2:0 format. Subscripts m and n are used to express the vertical position (in vertical direction of image) of the color difference signal in one frame of image, and m and n are combinations of values of (m, n)={(1, 0), (3, 1), (5, 2), . . . }. That is, m and n satisfy the relation of m=2n+1.

As shown in FIGS. 1A and 1B, between YUV 4:2:2 format and YUV 4:2:0 format, the number and position of luminance signals are the same. However, the color difference signals are different in both number (density) and position, that is, the phases are different. The process for converting from YUV 4:2:2 format (FIG. 1A) to YUV 4:2:0 format (FIG. 1B) is downsampling, while the process for converting from YUV 4:2:0 format to YUV 4:2:2 format is upsampling. For the sake of simplicity of explanation, data of the first field are particularly described below.

In the followings, upsampling for the color difference signal of digital image from FIG. 1B to FIG. 1A format is considered. Referring now to FIGS. 2A and 2B, with positional relation of signal $C_{2m}$, and signal $B_{2n}$ and $B_{2n+2}$, the value of $C_{2m}$ can be determined as the average value of $B_{2n}$ and $B_{2n+2}$ weighted at a rate of 5:3 respectively. Therefore, the digital filter outputting the value of $C_{2m}$ is expressed in formula (4).

$$C_{2m} = \frac{5B_{2n} + 3B_{2n+2}}{8} \quad \begin{matrix} n = 0, 1, 2, 3, \ldots \\ m = 1, 3, 5, 7, \ldots \end{matrix} \quad (4)$$

As the boundary condition (initial value), the color difference signal $C_0$ on the top line in YUV 4:2:2 format is determined as follows.

$$C_0 = B_0 \quad (5)$$

Similarly, referring to FIGS. 2A and 2B, from the positional relation of signal $C_{2m+2}$, and signal $B_{2n}$ and $B_{2n+2}$, the value of $C_{2m+2}$ is determined as the average of value of $B_{2n}$ and $B_{2n+2}$ weighted at a rate of 1:7. Therefore, the digital filter outputting the value of $C_{2m+2}$ is expressed in formula (6).

$$C_{2m+2} = \frac{B_{2n} + 7B_{2n+2}}{8} \quad \begin{matrix} n = 0, 1, 2, 3, \ldots \\ m = 1, 3, 5, 7, \ldots \end{matrix} \quad (6)$$

This calculation is operated on all sets of m and n, and upsampled color difference signals are obtained.

Herein, it is assumed that the input signal to the resampling detection apparatus is a signal upsampled from YUV 4:2:0 format to YUV 4:2:2 format by the FIR digital filter ("assumption A"). A signal value $C_k$ of an input signal can be expressed in formulas (4) and (6) with a signal value $B_j$ before resampling. Further, formulas (4) and (6) can be modified into the following formulas (8) and (7), respectively.

$$B_{2n+2} = \frac{8C_{2m+2} - B_{2n}}{7} \quad (7)$$

$$B_{2n+2} = \frac{8C_{2m} - 5B_{2n}}{3} \quad (8)$$

Therefore, to fulfill the assumption A, it is required to establish formulas (7) and (8) in arbitrary sets of m and n. When this required condition is satisfied, the input signal can be estimated as a signal upsampled from YUV 4:2:0 format by the FIR digital filter.

2. Resampling Detection Apparatus

2.1 Configuration

The resampling detection apparatus of the embodiment is explained below.

The resampling detection apparatus detects if the input signal is an upsampled signal as mentioned above. FIG. 3 is a block diagram of a resampling detection apparatus of the embodiment. The resampling detection apparatus 301 sequentially inputs (or receives) digital video signals of YUV 4:2:2 format as inputs, detects whether whole or part of image is resampled image or not based on information of the input signals, and outputs the detection result. It is noted that after the input video signals are buffered in advance, signals corresponding to necessary pixels are input to the resampling detection apparatus 301 sequentially.

The resampling detection apparatus 301 includes first and second resampling estimation sections 303 and 304, a delay unit 305, and a comparison detector 306. The first resampling estimation section 303 is means for estimating a signal before resampling from the input signal f in a first method. The second resampling estimation section 304 is means for estimating a signal before resampling from the input signal f in a second method. In this embodiment, the first resampling estimation section 303 and the second resampling estimation section 304 estimate the signal $B_j$ before resampling, using formula (7) and formula (8), respectively.

The delay unit 305 is means for outputting the output signal g from the first resampling estimation section 303 with a delay of a specified time until the next input signal f is entered. That is, the signal is delayed by the time required for estimation of a signal before resampling by the first and second resampling estimation sections 303 and 304. This operation allows each resampling estimation section using the previous estimated result to do calculation. The signal entered to the delay unit 305 is herein explained as the signal g from the first resampling estimation section 303, but the signal h from the second resampling estimation section may be used instead.

The comparison detector 306 is means for comparing output signals g and h from the first and second resampling estimation sections 303 and 304 to judge whether they are matched or not. The comparison detector 306 also stores judging results in every one of input signal g and signal h. When the results are matched in all inputs finally, the comparison detector 306 outputs a detection signal Sr showing the input video signal to be resampled, or otherwise outputs an undetected signal Sn as a comparison result signal j.

2.2 Operation

Operation of the resampling detection apparatus with the above mentioned configuration is described below.

It is assumed that a digital video signal of YUV 4:2:2 format in phase as shown in FIG. 1A is entered to the input terminal 302 as a signal f. As the signal f, it is supposed that each color difference signal arranged vertically in video signals of the same field is input sequentially from the top. That is, in FIG. 1A, $C_0$ is first input, $C_2$ and $C_4$ are input at next timing, and $C_6$ and $C_8$ are input at subsequent timing.

The first input $C_0$ is held as a boundary condition (initial value) $B_0$ in the delay unit 305 (see formula (5)). In other rows, inputs are processed simultaneously or sequentially, but the explanation is omitted.

From the input terminal 302, signal values $C_2$ and $C_4$ are input as the signal f, and a signal value $B_0$ is input from the delay unit 305 as an input signal i. Then the first resampling estimation section 303 sets n=0, m=1 in formula (7), and estimates and outputs a signal $B_2$ before resampling (see formula (9)) as a signal g.

$$B_2 = \frac{8C_4 - B_0}{7} \quad (9)$$

Similarly, the second resampling estimation section 304 sets n=0, m=1 in formula (8), and estimates and outputs a signal $B_2$ before resampling (see formula (9)) as a signal h.

$$B_2 = \frac{8C_2 - 5B_0}{3} \quad (10)$$

One (first required condition) of the required conditions for fulfilling the assumption A is that the values of $B_2$ estimated respectively from formulas (9) and (10) are equal. The comparison detector 306 compares the output signal g ($B_2$) of the first resampling estimation section 303 with the output signal h ($B_2$) of the second resampling estimation section 304. As a result of comparison, if both are equal, the comparison detector 306 stores the comparison result as "matched". The signal g is also fed into the delay unit 305 which then stores the signal value $B_2$.

Next, from the input terminal 302, signal values $C_6$ and $C_8$ are entered as the signal f, and from the delay unit 305, the signal value $B_2$ is entered as an input signal i. Then the first resampling estimation section 303 sets n=1, m=3 in formula (7), and estimates and outputs a signal $B_4$ (signal g) before resampling. On the other hand, the second resampling estimation section 304 sets n=1, m=3 in formula (8), and estimates and outputs a signal $B_4$ (signal h) before resampling. One (second required condition) of the required conditions for fulfilling the assumption A is that the two estimated values of $B_4$ are equal. The comparison detector 306 compares the output signal g ($B_4$) of the first resampling estimation section 303 with the output signal h ($B_4$) of the second resampling estimation section 304, and stores the comparison result. The signal g is also fed into the delay unit 305 which then stores the signal value $B_4$.

Similarly hereinafter, using the signal f from the input terminal 302 and the signal i from the delay unit 305, the resampling estimation sections 303 and 304 estimate signal values $B_{2n+2}$ before resampling in mutually different methods. The comparison detector 306 compares the two estimated signal values $B_{2n+2}$. This process is repeated in all sets of m and n while increasing the number of m and n, and plural required conditions are obtained. Finally, when all plural required conditions are satisfied, that is, when all comparison results are matched, the comparison detector 306 estimates that the input signal is a signal upsampled from YUV 4:2:0 format, and outputs a detection signal Sr. Otherwise the comparison detector 306 outputs an undetected signal Sn. Although quite incidentally, an input signal not being upsampled may happen to satisfy these required conditions, possibility of satisfying plural required conditions simultaneously seems extremely low.

Thus, the resampling detection apparatus of the present embodiment estimates the signal values before resampling in two different methods. When the two estimated signals are matched, the input signal is judged to be an upsampled signal. Thus, according to the resampling detection apparatus of the embodiment, it can be detected that the input signal is a signal upsampled from YUV 4:2:0 format, and by referring to the detection result in subsequent process, deterioration of frequency characteristic can be suppressed. Hence deterioration of video signal can be lessened.

2.3 Miscellaneous

In the embodiment, the highest line is defined as boundary condition, and by increasing the number of m and n, the resampling is detected from the higher line to lower line. However the lowest line may be defined as boundary condition, and by decreasing the number of m and n, the resampling can be detected from the lower line to higher line.

In the embodiment, there are also modified as follows, which may be similarly applied in the following embodiments described later.

In the embodiment, the first field is used for explanation, but the second field can be used for detection similarly. The concept of the embodiment is applied not only to interlaced scanning system, but also to progressive scanning system.

In the embodiment, the detection signal Sr is produced when all comparison results are matched for all input signals in the comparison detector. However the detection signal Sr may be produced when comparison results are matched for more than a specified number (or a specified rate) of input signals.

As for the comparison operation by the comparison detector, if an error of compared signal values is within a specified range, they may be judged to be "matched".

The embodiment is applied in the vertical direction of the video signal, but may be also applied in the horizontal direction. Furthermore it may be also applied to other signals than video signals.

The embodiment makes use of two-tap FIR digital filter with tap coefficient of (5, 3) or (1, 7). However the number of taps and tap coefficient are not limited to this. In the embodiment, since the number of taps is two, formulas are determined by using linear equations with two unknowns with respect to $B_{2n}$ and $B_{2n+2}$. However when the number of taps is three, formulas may be determined by using linear equations with three unknowns with respect to $B_{2n}$, $B_{2n+2}$, and $B_{2n+4}$. Similarly, when number of taps is n (an integer of n>3), formulas can be determined by using linear equations with n unknowns.

Embodiment 2

A resampling detection apparatus having a different configuration is explained. The resampling detection apparatus of the present embodiment is same as embodiment 1 in FIG. 3 in configuration. The resampling detection apparatus of embodiment 1 performs resampling detection for all sets of m and n. By contrast, the resampling detection apparatus of this embodiment can achieve resampling detection for a part of image signals.

Figure 4B:
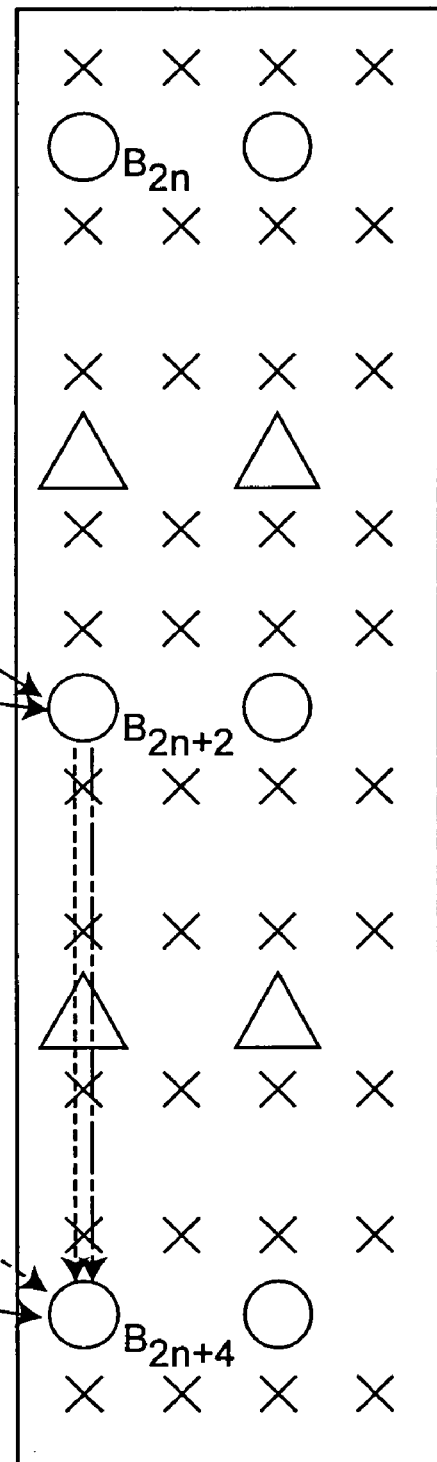

Referring to FIGS. 4A and 4B, operation of the resampling detection apparatus of the embodiment is explained. In this embodiment, instead of the boundary condition shown in formula (5), the value calculated in formula (11a) derived with respect to $B_{2n+2}$ from formulas (4) and (6) is used as the boundary condition. Hence, resampling can be detected using input signals of four or more arbitrary and continuous even-number of lines on a frame. That is, resampling can be detected using only part of a frame, and amount of arithmetic operation can be reduced.

$$B_{2n+2} = \frac{-C_{2m} + 5C_{2m+2}}{4} \quad (11a)$$

After determining the boundary condition with formula (11a), $C_{2m+4}$ and $C_{2m+6}$ are input, and $B_{2n+4}$ is determined from $B_{2n+2}$ and $C_{2m+4}$ with formula (11b). Further from $B_{2n+2}$ and $C_{2m+6}$, $B_{2n+4}$ is determined using formula (11c). Values of $B_{2n+4}$ determined from formula (11b) and formula (11c) are compared. When matched, the input signal is estimated to be upsampled from YUV 4:2:0 format, and a detection signal Sr is output. Otherwise, an undetected signal Sn is output. Formula (11b) is synonymous with formula (8), and formula (11c) is synonymous with formula (7).

$$B_{2n+4} = \frac{8C_{2m+4} - 5B_{2n+2}}{3} \quad (11b)$$

$$B_{2n+4} = \frac{8C_{2m+6} - B_{2n+2}}{7} \quad (11c)$$

More specifically, resampling detection on four lines of $C_{42}$, $C_{44}$, $C_{46}$, and $C_{48}$ is explained below.

First, signal values $C_{42}$ and $C_{44}$ are input as a signal f from input terminal 302. The resampling estimation section 303 sets (n, m)=(10, 21) in formula (11a) from signals $C_{42}$ and $C_{44}$, and determines and outputs $B_{22}$ as a signal g. The delay unit 305 holds the signal g ($B_{22}$) as a boundary condition (initial value).

Next, signal values $C_{46}$ and $C_{48}$ are input from the input terminal 302 as a signal f, and the signal value $B_{22}$ is input from the delay unit 305 as an input signal i. Then the first resampling estimation section 303 sets (n, m)=(11, 23) in formula (7), estimates and outputs a signal $B_{24}$ before resampling as a signal g. This signal g is held in the delay unit 305. The second resampling estimation section 304 sets (n, m)=(11, 23) in formula (8), estimates and outputs a signal $B_{24}$ before resampling as a signal h.

The required condition for fulfilling the assumption A mentioned in embodiment 1 is that the values of $B_{24}$ estimated by the first and second resampling estimation sections 303 and 304 should be matched. The comparison detector 306 compares the signal g ($B_{24}$) output from the first resampling estimation section 303 with the signal h ($B_{24}$) output from the second resampling estimation section 304. When the comparison results are matched, the comparison detector 306 estimates that the input signal is a signal upsampled from YUV 4:2:0 format to output a detection signal Sr. Otherwise, the comparison detector 306 outputs an undetected signal Sn.

The comparison detector 306 stores the comparison results, judges if all comparison results are "matched" after input of all input signals used in the resampling detection. Thus it can detect resampling using input signals of four or more even-number of lines.

In such a manner, process to be applied can be changed according to areas in a frame. For example, a frame may be divided into plural parts each composed of four or more even-number of lines, such as a part of $11 \leq n \leq 20$ and a part of $21 \leq n \leq 30$, resampling may be detected in each divided parts, and the filter to be applied in each portion can be changed depending on the detection result.

Embodiment 3

A resampling detection apparatus having other different configuration is explained. The resampling detection apparatus of the embodiment has the same function as that of embodiment 2, except not having a feedback circuit. Hence, in the resampling detection apparatus of the embodiment, it is not necessary to consider the input timing of a signal from the input terminal, and this point is advantageous over the resampling detection apparatus of embodiment 2.

Figure 5:
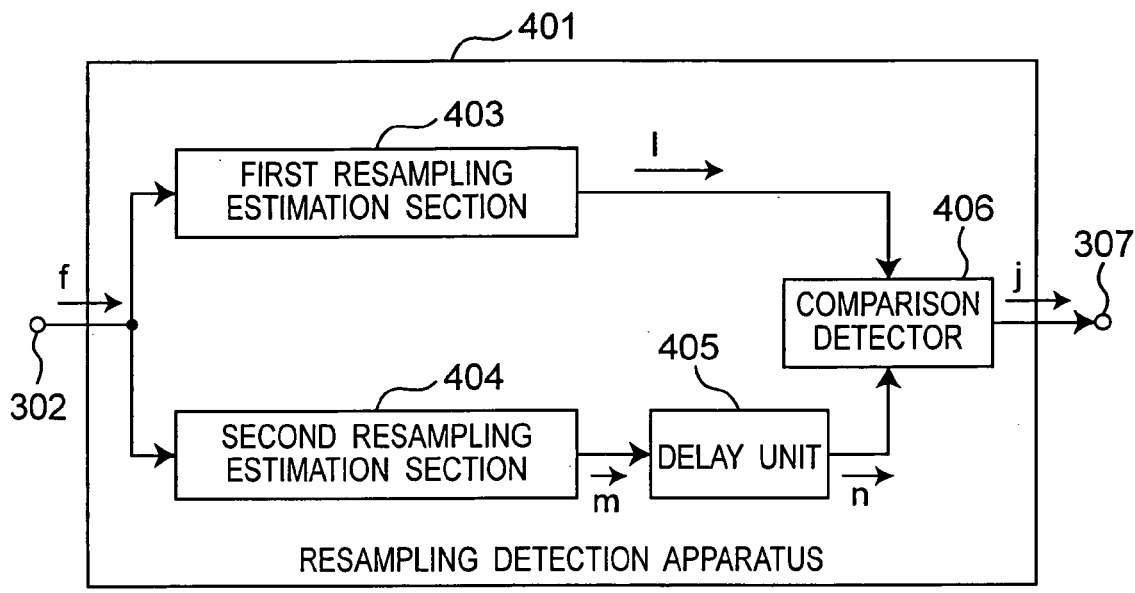
FIG. 5 is a block diagram of a resampling detection apparatus in embodiment 3.

FIG. 5 is a block diagram of resampling detection apparatus in this embodiment. The same parts as in embodiment 1 are identified with the same reference numerals, and explanation is omitted.

In the resampling detection apparatus 401 of the embodiment, the first resampling estimation section 403 is means for estimating a signal before resampling in a first method. The second resampling estimation section 404 is means for estimating a signal before resampling in a second method. The delay unit 405 is means for outputting the output of the second resampling estimation section 404 with a delay of a specified time required for estimating the signal before resampling in the first and second resampling estimation sections 403 and 404. The comparison detector 406 is means for comparing the output of the first resampling estimation section 403 with the output of the delay unit 405 to judge if the both outputs are matched. The operation of the comparison detector 406 for storing the judging results and outputting the final result of the detection is same as in embodiment 1.

Operation of the resampling detection apparatus 401 of the embodiment having such a structure is explained below. For the sake of simplicity of explanation, the data of the first field is particularly used below. In this embodiment, the first resampling estimation section 403 and second resampling estimation section 404 estimate signals $B_j$ before resampling using formula (12) and formula (11a), respectively.

In the following example, signal values $C_{2m}$ and $C_{2m+2}$ of a digital video signal with a phase shown in FIG. 1A are input from the input terminal 302 as a signal f. When the assumption A is fulfilled, these input signals should satisfy formula (11a) and formula (12) with respect to $B_2n$ derived from formulas (4) and (6).

$$B_{2n} = \frac{7C_{2m} - 3C_{2m+2}}{4} \quad (12)$$

When signals $C_{2m}$ and $C_{2m+2}$ are input, the first resampling estimation section 403 estimates and outputs $B_2$ from formula (12) as a signal l, while the second resampling estimation section 404 estimates and outputs $B_{2n+2}$ from formula (11a) as a signal m.

The signal m is stored in the delay unit 405, and the delay unit 405 outputs the previous signal n ($B_{2n}$). As a result, the signal l ($B_{2n}$) and signal n ($B_{2n}$) are entered simultaneously in the comparison detector 406. Herein, the required condition for fulfilling the assumption A is that signal l ($B_{2n}$) output from the first resampling estimation section 403 and signal n ($B_{2n}$) output from the delay unit 405 should be matched.

The comparison detector 406 compares the signal l with the signal n. When the both are matched, the comparison detector 406 stores the result as being "matched". After all of input signals used in resampling detection are input, when all comparison results are matched, the input signal is estimated to be a signal upsampled from YUV 4:2:0 format, and the detection signal Sr is output, or otherwise the undetected signal Sn is output.

Embodiment 4

This embodiment relates to a signal restoring apparatus that receives a video signal resampled (upsampled) by a FIR digital filter, and restores and outputs a video signal before resampling.

Figure 6:
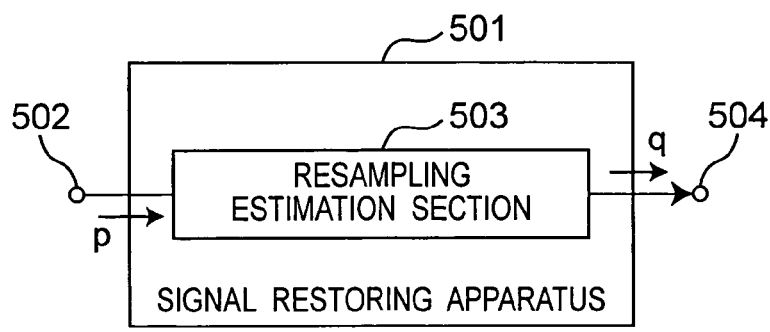
FIG. 6 is a block diagram of a signal restoring apparatus in embodiment 4.

FIG. 6 shows a configuration of a signal restoring apparatus of this embodiment. The signal restoring apparatus 501 includes a resampling estimation section 503 as means for estimating a signal before resampling from the input signal. Referring to FIG. 6, operation of the signal restoring apparatus is explained below.

It is supposed below that a signal of YUV 4:2:0 format shown in FIG. 1B is upsampled to a signal of YUV 4:2:2 format shown in FIG. 1A by the FIR digital filter described in embodiment 1, and that the upsampled signal is entered in the input terminal 502.

For the sake of simplicity of explanation, the data of the first field is used for the following explanation. A signal p input from the input terminal 502 is signal with values $C_{2m}$ or $C_{2m+2}$. The resampling estimation section 503 determines a signal value $B_2$, using formula (12) from signal values $C_{2m}$ and $C_{2m+2}$ of the input signal p, and outputs the determined signal value $B_2$ as a signal q.

This signal restoring apparatus thus processes on all sets of m and n. As a result, regardless of whether phases of signals are matched before and after upsampling, the signal before upsampling can be estimated and restored. When the signal restoring apparatus of the invention is applied to a recording and reproducing apparatus, the recording and reproducing can be improved for suppressing deterioration of frequency characteristic even if dubbing is repeated.

Embodiment 5

This embodiment relates to a resampling apparatus for signals in vertical direction of video signals. The resampling apparatus detects whether the input video signal is a resampled signal or not. If the input video signal is not resampled signal, the resampling apparatus resamples the input signal with a FIR digital filter, and outputs the resampled signal. If the input video signal is a resampled signal, the resampling apparatus restores a signal before resampling, and outputs the restored signal.

Figure 7A:
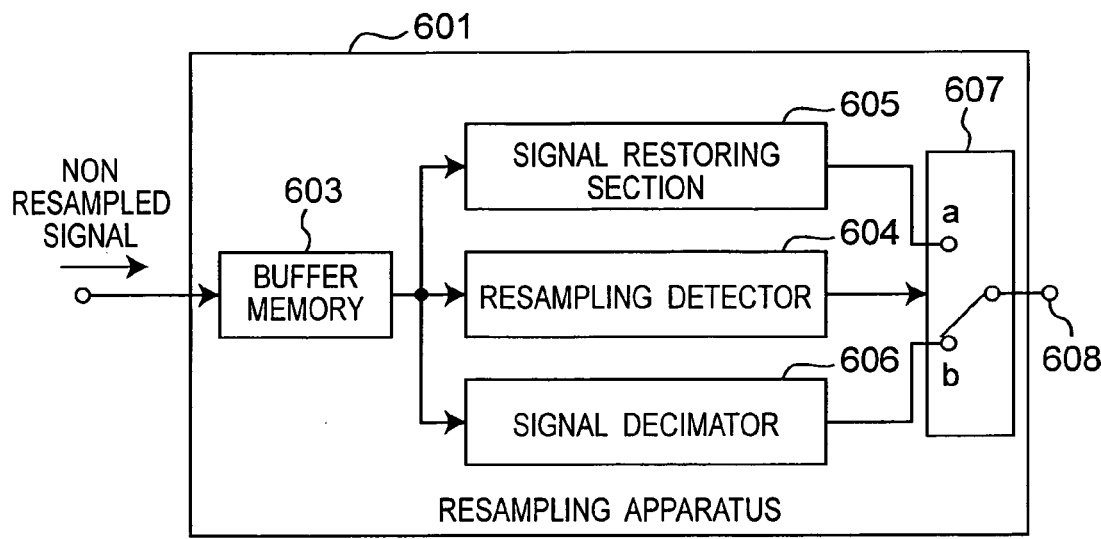
FIGS. 7A and 7B are block diagrams of a resampling apparatus in embodiment 5.
Figure 7B:
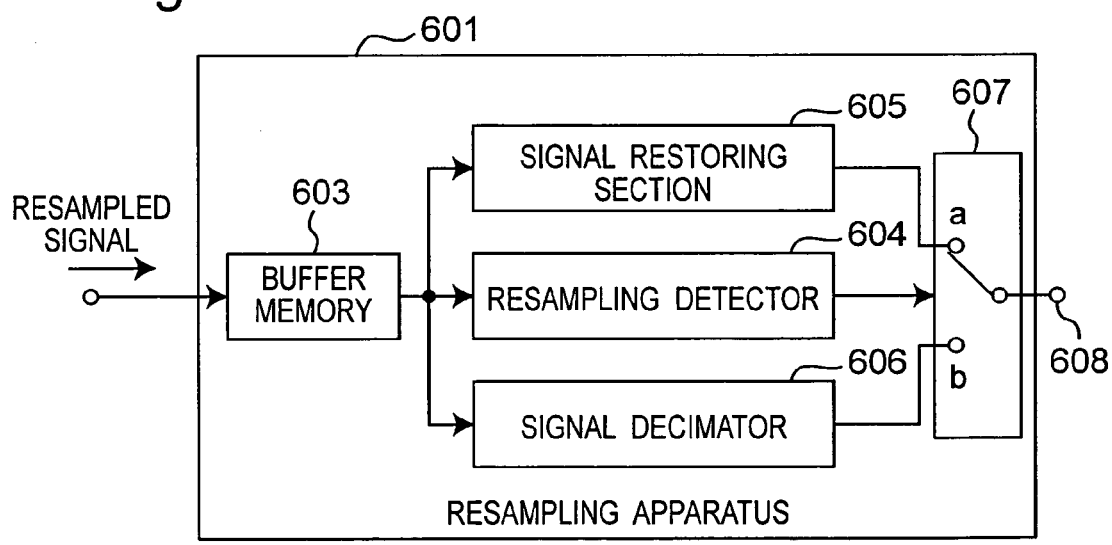

FIGS. 7A and 7B show a configuration of the resampling apparatus in the embodiment. The resampling apparatus 601 includes a buffer memory 603 for storing the input signal, a resampling detector 604 for detecting whether the input signal is resampled signal or not, a signal restoring section 605 for restoring a signal before resampling from the input signal, a signal decimator 606 for resampling with a FIR digital filter, and a switch 607 for changing over the output to either the output from the signal restoring section 605 or the output from the signal decimator 606.

The video signal entered in the input terminal 602 is stored in the buffer memory 603, and the stored signal value is output from the buffer memory 603 as required. The resampling detector 604 has the same function and operation as the resampling detection apparatus described in embodiments 1 to 3, and is means for detecting whether the input signal in the input terminal 602 is a resampled signal or not. The signal restoring section 605 is means for restoring a signal before resampling described in embodiment 4. The signal decimator 606 is means for decimating input signals by the FIR digital filter. The switch 607 receives a control signal from the sampling detector 604, and selects the output from the signal restoring section 605 or the output from the signal decimator 606 to output the selected output to the output terminal 608.

As for the resampling apparatus of the invention having such a structure, the operation is described below. In FIG. 7A is a diagram for explaining the operation when a signal not resampled is entered, and FIG. 7B is a diagram when a resampled signal is entered.

First, referring to FIG. 7A, the operation of the resampling apparatus with a non resampled signal of YUV 4:2:2 format (see FIG. 1A) entered is explained below.

In the resampling apparatus, the resampling detector 604 detects that the input signal from the input terminal 602 is not resampled, and outputs an undetected signal Sn to the switch 607. The signal decimator 606 decimates color difference signals using the FIR digital filter to convert the input signal of YUV 4:2:2 format into YUV 4:2:0 format (see FIG. 1B). On the basis of the undetected signal Sn from the resampling detector 604, the switch 607 connects a contact to a point b. As a result, the signal converted to YUV 4:2:0 format by the signal decimator 606 is output from the output terminal 608.

Referring to FIG. 7B, the operation of the resampling apparatus with a resampled signal of YUV 4:2:2 format entered is explained below.

The signal restoring section 605 restores a signal before resampling from the input signal. The restoring method is same as explained in embodiment 4. The resampling detecting means 604 detects that the input signal from the input terminal 602 is a resampled signal, and outputs a detected signal Sr to the switch 607. The switch 607 connects the contact to a point a on the basis of the detected signal Sr. As a result, the signal restored by the signal restoring section 605 is output from the output terminal 608.

Thus, according to the resampling apparatus of the embodiment, when the input signal is detected to be an already upsampled signal, the signal restoring section 605 can restore the signal before upsampling without deterioration of frequency characteristic. Thus, even though resampling is repeated, deterioration of signal can be suppressed. If the input signal is detected to be not upsampled signal, the signal decimator 606 decimates signals (down samples) using the FIR digital filter.

Thus, in the embodiment, when upsampled data is entered, original data before resampling is restored and output, and therefore deterioration of signal due to repetition of resampling can be suppressed.

The embodiment is applied in vertical direction of video signals, but may also be applied in horizontal direction. The embodiment is also applied in other signal than a video signal.

Embodiment 6

Figure 8:
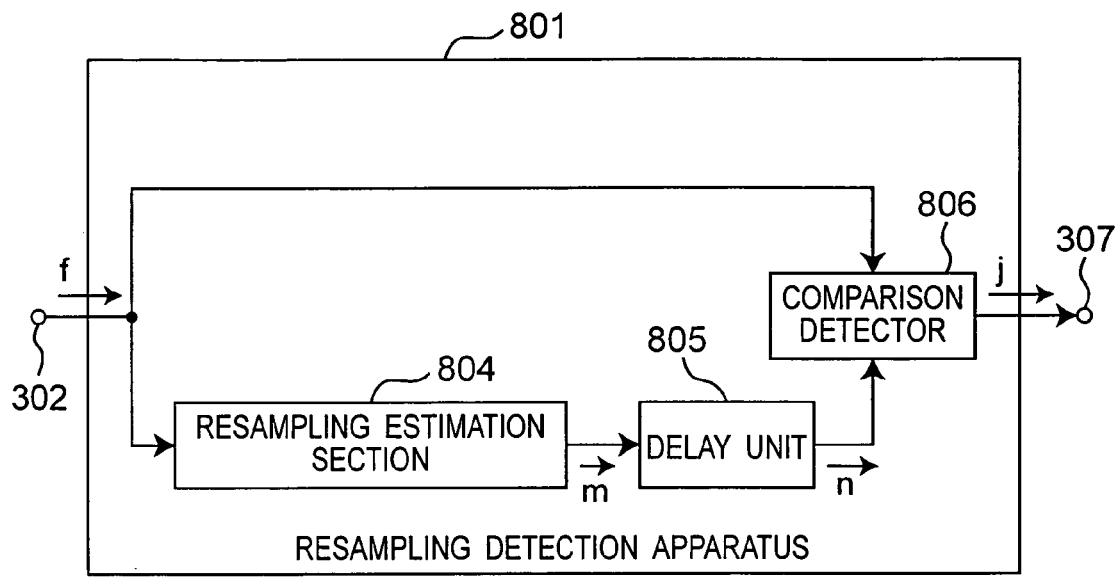
FIG. 8 is a block diagram of a resampling apparatus in embodiment 6.

A resampling detection apparatus having a further different configuration is explained. FIG. 8 shows the resampling detection apparatus of this embodiment. The resampling detection apparatus 801 includes a resampling estimation section 804, a delay unit 805, and a comparison detector 806. The resampling estimation section 804 estimates a signal $B_j$ before resampling from the input signal under the assumption A, and estimates an input signal $C_k$ using the estimated $B_j$ and the input signal. The delay unit 805 delays a signal from the resampling estimation section 804 by the processing time of the resampling estimation section 804. The comparison detector 806 compares the input signal received actually with the delayed output signal (estimated input signal) of the resampling estimation section 804 to output the comparison result as a detected signal Sr/undetected signal Sn.

Figure 9A:
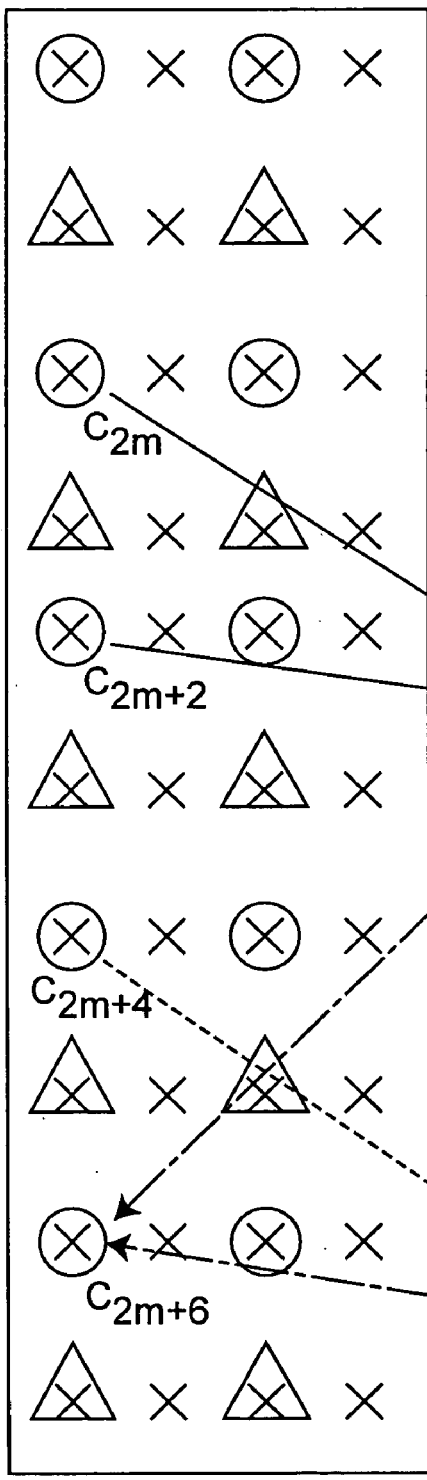
FIGS. 9A and 9B are explanatory diagrams of a resampling detecting operation in embodiment 6.
Figure 9B:
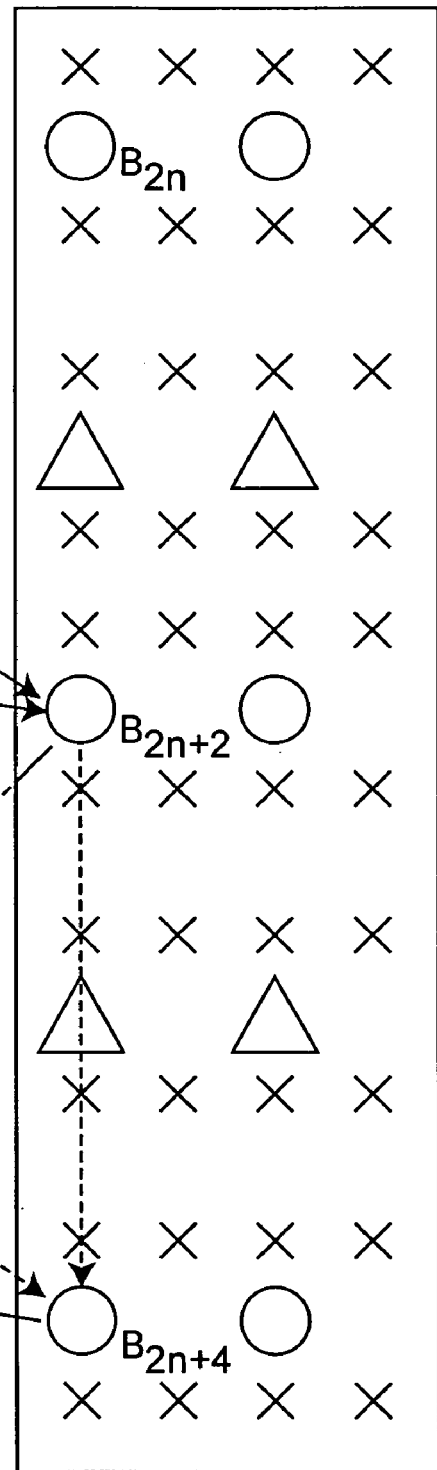
Figure 10A:
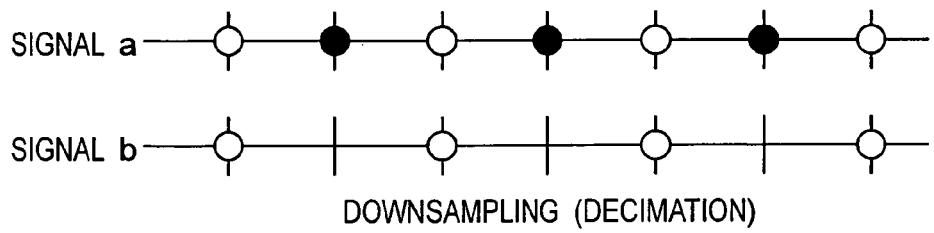
FIGS. 10A to 10C are explanatory diagrams of a resampling process in a conventional resampling apparatus.
Figure 10B:
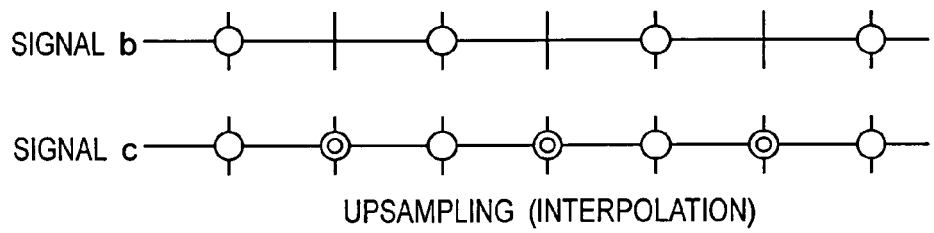
Figure 10C:
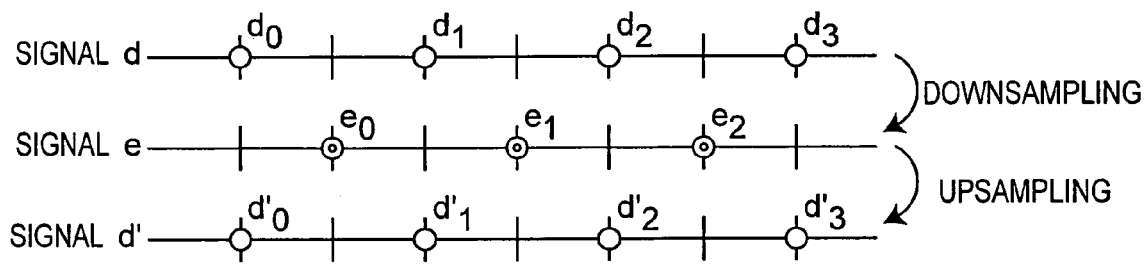

Referring to FIGS. 9A and 9B, operation of the resampling detection apparatus of the embodiment is explained. For the sake of simplicity of explanation, the data of first field are particularly used for explanation below.

The sampling estimation section 804 receives signal values $C_{2m}$ and $C_{2m+2}$ of a digital video signal through the input terminal 302, and determines a signal value $B_{2n+2}$ using formula (11a). Further, the sampling estimating unit 804 receives a signal value $C_{2m+4}$, and puts the received signal value $C_{2m+4}$ and previously determined signal value $B_{2n+2}$ into formula (13) to determine a signal value $B_{2n+4}$.

$$B_{2n+4} = \frac{8C_{2m+4} - 5B_{2n+2}}{3} \quad (13)$$

The sampling estimation section 804 puts the two determined signal values $B_{2n+2}$ and $B_{2n+4}$ into formula (14) (same as formula (6)), and determines signal value $C_{2m+6}$ to output the determined signal as a signal m.

$$C_{2m+6} = \frac{B_{2n+2} + 7B_{2n+4}}{8} \quad (14)$$

The signal m is stored in the delay unit 805. The delay unit 805 delays and outputs a signal n ($C_{2m+6}$) so that the actually received signal f ($C_{2m+6}$) and the estimated signal n ($C_{2m+6}$) may be entered in the comparison detector 806 at the same time. Coincidence of actually entered signal f ($C_{2m+6}$) and estimated signal n ($C_{2m+6}$) is a required condition for fulfilling the assumption A.

The comparison detector 806 compares the signal f with the signal n. When both are the same, the comparison detector 806 stores the result as being "matched". After input of specified input signals used in resampling detection, when all results of comparison are matched, the input signal is estimated to be a signal upsampled from YUV 4:2:0 format, and the detected signal Sr is output. Otherwise, the undetected signal Sn is output. The comparison detector 806 may also be designed to output the detected signal Sr when comparison result is matched in more than a specified number (or specified rate) of input signals.

According to the resampling detection apparatus of the embodiment, too, same as in embodiment 1 and others, the input signal is detected to be a signal upsampled from YUV 4:2:0 format. Hence, using this detection result in the subsequent process, deterioration of frequency characteristic can be suppressed.

Although the present invention has been described in connection with specified embodiments thereof, many other modifications, corrections and applications are apparent to those skilled in the art. Therefore, the present invention is not limited by the disclosure provided herein but limited only to the scope of the appended claims. The present disclosure relates to subject matter contained in Japanese Patent Application No. 2005-115320, filed on Apr. 13, 2005, which is expressly incorporated herein by reference in its entirety.

INDUSTRIAL APPLICABILITY

According to a resampling apparatus of the invention, even if conversion of sampling rate is repeated, frequency characteristic does not deteriorate by a digital filter. Thus the invention is useful in recording and reproducing apparatus for recording and reproducing at different sampling rates, or in a repeater or the like with different sampling rate between reception side and transmission side.

What is claimed is:

1. A resampling detection apparatus for receiving a plurality of input signals composing a digital signal, and detecting whether the digital signal is a resampled signal, the resampling detection apparatus comprising:
    an estimator operable to estimate one signal before resampling from at least two input signals, and to estimate subsequent signals before resampling, using the one estimated signal as an initial value; and
    a detector operable to detect whether the digital signal is a resampled signal, using the estimated signal and one or more input signals.

2. The resampling detection apparatus according to claim 1, wherein the estimator estimates the signal before resampling, solving a linear equation based on the number of taps and a tap coefficient of a digital filter used in upsampling.

3. The resampling detection apparatus according to claim 2, wherein the digital filter is a FIR digital filter.

4. The resampling detection apparatus according to claim 1, wherein the resampling is upsampling from YUV 4:2:0 to YUV 4:2:2.

5. A resampling apparatus for receiving through an input terminal a plurality of input signals for composing a digital signal, resampling and outputting the received signals through an output terminal, the resampling apparatus comprising:
    a signal restorer operable to generate a signal before resampling for the digital signal from one or more input signals;
    a signal decimator operable to decimate the one or more input signals,
    a resampling detector operable to detect whether the digital signal is a resampled signal from one or more input signals and to output a detection signal when the digital signal is detected to be a resampled signal, or output an undetected signal when the digital signal is not detected to be a resampled signal; and
    a switch operable to receive an output from the resampling detector, and connect an output from the signal restorer to the output terminal when the output from the resampling detector is the detection signal, or connect an output from the signal decimator to the output terminal when the output from the resampling detector is the undetected signal,
    wherein the resampling detector includes an estimator operable to estimate one signal before resampling from at least two input signals, and to estimate subsequent signals before resampling, using the one estimated signal as an initial value, and a detector operable to detect whether the digital signal is a resampled signal using the estimated signal and one or more input signals.

6. A resampling detecting method for receiving a plurality of input signals composing a digital signal, and detecting whether the digital signal is a resampled signal, the resampling detecting method comprising:

estimating one signal before resampling from at least two input signals, and estimating subsequent signals before resampling, using the one estimated signal as an initial value, and detecting whether the digital signal is a resampled signal using the estimated signal and one or more input signals.

7. A resampling method for receiving a plurality of input signals composing a digital signal and resampling the received signal to output the resampled signal, the resampling method comprising:

restoring a signal before resampling for the digital signal from one or more input signals;

decimating the one or more input signals;

estimating one signal before resampling from at least two input signals, and estimating subsequent signals before resampling. using the one estimated signal as an initial value;

detecting whether the digital signal is a resampled signal while using the estimated signal and one or more input signals; and outputting the restored signal before resampling when the digital signal is detected to be a resampled signal, while outputting the decimated signal when the digital signal is not detected to be a resampled signal.

8. The resampling apparatus according to claim 5, wherein the estimator estimates the signal before resampling, solving a linear equation based on the number of taps and a tap coefficient of a digital filter used in upsampling.

9. The resampling detection method according to claim 6, wherein the estimating solves a linear equation based on the number of taps and coefficient of taps of a digital filter used in upsampling to estimate the signal before resampling.

10. The resampling method according to claim 7, wherein the estimating solves a linear equation based on the number of taps and coefficient of taps of a digital filter used in upsampling to estimate the signal before resampling.

11. The resampling apparatus according to claim 5, wherein the resampling is upsampling from YUV 4:2:0 to YUV 4:2:2.

12. The resampling method according to claim 6, wherein the resampling is upsampling from YUV 4:2:0 to YUV 4:2:2.

13. The resampling method according to claim 7, wherein the resampling is upsampling from YUV 4:2:0 to YUV 4:2:2.

* * * * *